3,703,419
SURFACE FINISHING
Donald F. Esler, Natrona Heights, and Edward G. Choby, Jr., Pittsburgh, Pa., assignors to Allegheny Ludlum Industries, Inc., Pittsburgh, Pa.
No Drawing. Filed Sept. 1, 1970, Ser. No. 68,789
Int. Cl. C23f 7/00
U.S. Cl. 148—6.16                                    29 Claims

ABSTRACT OF THE DISCLOSURE

A composition for providing a metallic surface with protection against marring, marking, and staining which comprises an aqueous solution having a molar concentration of phosphate, chromate, magnesium, and ammonium ions of from 0.01 to 1.00 mole per 100 ml. of water and a molar concentration of silicate ions of from 0.01 to 33% of the molar concentration of phosphate, chromate, magnesium, and ammonium ions. The phosphate, chromate, magnesium, and ammonium ions are proportionately present in the aqueous solution as 27–73 mole percent phosphate ion, 5–39 mole percent chromate ion, 0–23 mole percent magnesium ion, and 0.5–35 mole percent ammonium ion.

A method of providing a metallic surface with a coating for protecting the metallic surface against marring, marking, and staining which comprises the steps of coating the surface with the composition of this invention and curing the coating so as to render it substantially water insoluble.

A composite article comprising a layer of metal and at least one layer of a substantially water insoluble, transparent, cured coating which offers protection from marring, marking, and staining. The coating is comprised of anionic polymeric chains of phosphorus, chromium, oxygen, and silicon atoms with or without magnesium cations.

---

The present invention relates to a coating for protecting a metallic surface from marring, marking, and staining, to a method of providing a metallic surface with a coating for protecting the metallic surface from marring, marking, and staining and to a composite article comprising a layer of metal and a coating which protects the metal from marring, marking, and staining.

Numerous articles of manufacture, such as water fountains and building panels, have decorative metallic surfaces, e.g., stainless steel. These surfaces are in need of protection as they are subjected to severe abuse. They are scratched, smeared by natural skin oils and other contaminants found on hands, weathered by various atmospheric conditions and stained by different solvents and chemicals.

Considerable time and money has been spent on developing a coating which will protect metallic surfaces from marring, marking, and staining. A particular coating is disclosed in U.S. patent application Ser. No. 437, filed on Jan. 2, 1970. It teaches a cured coating of magnesium cations and anionic polymeric chains of chromium, oxygen, and phosphorus atoms along with a method of providing a metallic surface with the protective coating. We have found that coatings similar to those referred to in Ser. No. 437 can be substantially improved if they contain silicon atoms.

It is accordingly an object of this invention to provide a coating for protecting a metallic surface from marring, marking, and staining.

It is another object of this invention to provide a method for protecting a metallic surface from marring, marking, and staining.

It is a further object of this invention to provide a composite article comprising a layer of metal and a coating which protects the metal from marring, marking, and staining.

The composition of this invention is an aqueous solution having a molar concentration of phosphate, chromate, magnesium, and ammonium ions of from 0.01 to 1.00, preferably 0.25 to 0.60 mole per 100 ml. of water and a molar concentration of silicate ions of from 0.01 to 33%, preferably 0.5 to 20%, of the molar concentration of phosphate, chromate, magnesium, and ammonium ions. An upper limit of 1.0 mole of phosphate, chromate, magnesium, and ammonium ions per 100 ml. of water is set as solutions with higher concentrations of these ions have too high a solid level and produce a cloudy, bubbly coat. On the other hand, there does not appear to be a minimum concentration of these ions in the water. Any composition which gives a transparent coating will continue to give a transparent coating as the amount of water is increased. The only effect of dilution is to decrease the coating thickness. For practical purposes a lower limit of 0.01 mole of ions per 100 ml. of water has been set. A molar concentration of silicate ion as low as 0.01% of the molar concentration of phosphate, chromate, magnesium, and ammonium ion is sufficient to improve abrasion resistance. An upper molar concentration for silicate ion of 33% of the molar concentration of phosphate, chromate, magnesium, and ammonium ions is set as this is the limit of silicate ion, as $SiO_2$ (see discussion below), solubility in the coating solution. In the course of this application, the term phosphate ion includes all ions related to phosphoric acid in an aqueous solution. Thus, the species $H_3PO_4$, $H_2PO_4$, $HPO_4$, and $PO_4$ and any polymeric phosphorus oxyacid anions are collectively referred to as phosphate ion. Similarly, $CrO_3$ in solution may exist as $CrO_4$, $Cr_2O_7$, etc., as well as in various protonated forms, all of which are included in the term chromate ion. The term silicate ion includes all the complex silicate ions but is taken as $SiO_2$, regardless of its actual chemical structure, for purposes of calculating the number of moles.

The phosphate, chromate, magnesium, and ammonium ions are proportionately present in the aqueous solution as 27–73 mole percent phosphate ion, 5–39 mole percent chromate ion, 0.23 mole percent magnesium ion, and 0.5–35 mole percent ammonium ion and preferably as 40–67 mole percent phosphate ion, 7–26 mole percent chromate ion, 5–20 mole percent magnesium ion, and 4–20 mole percent ammonium ion. Phosphate ion is required to render the solution acidic. A minimum phosphate ion level of 27 mole percent is necessary in order for the other ions of the solution to adequately dissolve. An upper limit of 73 mole percent phosphate ion is set as the cured coating becomes water soluble with higher phosphate levels. Chromate ion assists in giving the coating its transparency and is required to render the coating substantially water insoluble after curing. Solutions with less than 5 mole percent chromate ion produce opaque cured coatings and solutions with more than 39 mole percent chromate ion produce blotchy coatings which require excessive curing times. Magnesium ions aid in rendering the cured coating substantially water insoluble and decrease curing times. An upper limit of 23 mole percent magnesium ion is imposed as 23 mole percent magnesium ion is the limit of the solubility for magnesium ions in the coating solution. Ammonium ion assists in giving the coating its transparency. Solutions with less than 0.5 and more than 35 mole percent ammonium ion produce opaque cured coatings.

The ions, i.e., phosphate, chromate, magnesium, ammonium, and silicate may be supplied in various ways. Phosphate ion is most conveniently supplied as orthophosphoric acid. It can also be supplied as magnesium phosphate, ammonium phosphate, or magnesium ammonium phosphate. Chromate ion may be supplied as chromium trioxide or as the chromate or dichromate salts of magnesium or ammonium. Magnesium ion may be supplied as the oxide, hydroxide, carbonate, bicarbonate, phosphate, or chromate. Ammonium ion may be supplied as uncombined ammonia, aqueous ammonium hydroxide or as the phosphate, chromate, carbonate, or bicarbonate salts. Silicate ion may be supplied from any water soluble silicate compound, i.e., compounds of silica which can be made to form a solution or sol with water. Illustrative water soluble silicate compounds are the alkali metal silicates, more particularly lithium silicate, sodium silicate, and potassium silicate, and colloidal sols of silica. The use of metal silicates will, however, add additional ions to the coating solution. These ions are not necessary for the attainment of the desired coating properties and are not, therefore, necessarily included in the description of the composition of this invention. Similarly, other ions which may be present are not included in the description as they do not materially affect the resulting coating. When the ammonium or magnesium ions are supplied as their phosphate or chromate salts, the composition ratios of the solution are limited to the composition ratios of the particular salts used. Variations of these composition ratios can, however, be produced by adding extra magnesium or ammonium as one or the other acceptable compounds. For calculating molar concentrations only the water added as water to the solution is used and not the water in the silicates, acids, hydroxides nor that resulting from neutralization.

A wetting agent can be added to the coating solution to insure the best possible wetting action at the metal surface. The use of wetting agents is optional and by no means necessary. Typical wetting agents are "Wetanol" (Glyco Products, Inc., New York, N.Y.) and "Alkanol HCS" (E. I. du Pont de Nemours & Company, Wilmington, Del.).

The method of this invention comprises the steps of coating a decorative exposed metallic surface with the above-described aqueous coating solution of this invention and curing the coating so as to render it substantially water insoluble.

Any of the well-known coating methods can be employed. The invention is not dependent upon the use of any particular coating method. Illustrative coating methods are dip coating, flow coating, spray coating, roll coating, and spin coating.

Curing is a time and temperature dependent process. Shorter times are required at higher temperatures and longer times are required at lower temperatures. Curing temperatures, i.e., the temperatures at the metallic surface, of from 400 to 1900° F. can be employed at times ranging from two seconds to four hours.

Various colors and tints can be given to the coating by varying the curing temperature. This enables certain metals, e.g., stainless steel, to take on the appearance of color without treating the metal, e.g., heat tinting the metal. Color can also be varied by adjusting the relative proportion of magnesium, ammonium, chromate and phosphate ions which are present in the aqueous solution and/or by adjusting the thickness of the cured coating. It is also within the scope of this invention to add pigments, dyes, and other chemical agents to alter the color of the coating.

The article of this invention is comprised of a layer of metal having a decorative, exposed metallic surface and at least one layer of a substantially water insoluble, transparent, cured coating which offers protection from marring, marking, and staining, disposed in adhering relation on the decorative surface. The coating is comprised of anionic polymeric chains of phosphours, chromium, oxygen, and silicon atoms with or without magnesium cations. No limit is placed on the thickness of the coating although each individual layer should not exceed 0.0005 inch. Layers thicker than 0.005 inch require an excessive amount of coating solution and acquire a frosty appearance during curing.

The cured coating additionally contains alkali metal cations when the silicon atoms are supplied from alkali metal silicates. Alkali metal cations are not, however, necessary for the attainment of the desired coating and are not, therefore, necessarily included in the description of the article of this invention.

Although the invention is believed to be adaptable to a wide variety of metallic surfaces which include stainless steel, brass, aluminum, silver, zinc, copper, plain carbon steel, lead, chromium, nickel, gold plate black chrome and platinum; stainless steel is probably the most important decorative metal and accordingly, the following examples are directed to stainless steel embodiments. Stainless steel has a strikingly noticeable tendency to show scratches and marks which cannot be easily removed by any known commercial means without destroying its uniform appearance.

EXAMPLE I

Stainless steel panels were heat tinted by heating for several minutes at 1000° F., dip coated in solution A, and cured at 600° F. for five minutes. The A coating solution was an aqueous solution containing phosphate, chromate, magnesium, and ammonium ions. It had a molar concentration of phosphate, chromate, magnesium, and ammonium ions of 0.448 mole of these ions per 100 ml. of water. The phosphate, chromate, magnesium, and ammonium ions were proportionately present as 62 mol percent phosphate ion, 13 mole percent chromate ion, 15 mole percent magnesium ion, and 10 mole percent ammonium ion.

Additional stainless steel panels were heat tinted by heating for several minutes at 1000° F., dip coated in solution B and cured at 600° F. for five minutes. The B coating solution was an aqueous solution containing phosphate, chromate, magnesium, ammonium, and silicate ions. It had a molar concentration of phosphate, chromate magnesium and ammonium ions of 0.448 mole of these ions per 100 ml. of water and a molar concentration of silicate ions of 13.1% of the molar concentration of phosphate, chromate, magnesium, and ammonium ions. The phosphate, chromate, magnesium, and ammonium ions were proportionately present as 62 mole percent phosphate ion, 13 mole percent chromate ion, 15 mole percent magnesium ion, and 10 mole percent ammonium ion.

The ions for the A and B solutions were obtained from orthorphosphoric acid, magnesium oxide, ammonium hydroxide, chromium trioxide and sodium silicate.

Both the panels with the A and B coatings were subjected to 40 wear cycles on a "Taber Abraser" (Taber Instrument Corporation, North Tonawanda, N.Y.). The panels prepared from coating solution B with silicate ions showed significantly less abrasion than did the panels prepared from coating solution A without silicate ions.

EXAMPLE II

Stainless steel panels were heat tinted by heating for several minutes at 1000° F., dip coated in solution A (described above), and cured at 600° F. for five minutes.

Additional stainless steel panels were heat tinted by heating for several minutes at 1000° F., dip coated in solution C, and cured at 600° F. for five minutes. The C coating solution was an aqueous solution containing phosphate, chromate, magnesium, ammonium and silicate ions. It had a molar concentration of phosphate, chromate, magnesium, and ammonium ions of 0.448 mole of these ions per 100 ml. of water and a molar concentration of silicate ions of 4.7% of the molar concentration of phosphate, chromate, magnesium, and ammonium ions. The phosphate, chromate, magnesium, and ammonium ions. The phosphate, chromate, magnesium, and ammonium ions were proportionately present as 62 mole percent phosphate ion, 13 mole percent chromate ions, 15 mole percent magnesium ion, and 10 mole percent ammonium ion. The ions for the C solution were obtained from orthophosphoric acid, magnesium oxide, ammonium hydroxide, chromium trioxide, and potassium silicate.

Both the panels with the A and C coatings were subjected to 40 wear cycles on a "Taber Abraser." The panels prepared from coating solution C with silicate ions showed significantly less abrasion than did the panels prepared from coating solution A without silicate ions.

EXAMPLES III

Stainless steel panels were heat tinted by heating for several minutes at 1000° F., dip coated in solution A (described above) and cured at 600° F. for five minutes.

Additional stainless steel panels were heat tinted by heating for several minutes at 1000° F., dip coated in solution D, and cured at 600° F. for five minutes. The D coating solution was an aqueous solution containing phosphate, chromate, magnesium, ammonium, and silicate ions. It had a molar concentration of phosphate, chromate, magnesium, and ammonium ions of 0.448 mole of these ions per 100 ml. of water and a molar concentration of silicate ions of 1.4% of the molar concentration of phosphate, chromate, magnesium, and ammonium ions. The phosphate, chromate, magnesium, and ammonium ions were proportionately present as 62 mole percent phosphate ion, 13 mole percent chromate ion, 15 mole percent magnesium ion, and 10 mole percent ammonium ion. The ions for the D solution were obtained from orthophosphoric acid, magnesium oxide, ammonium hydroxide, chromium trioxide, sodium silicate, potassium silicate and lithium silicate.

Both the panels with the A and D coatings were subject to 40 wear cycles on a "Taber Abraser." The panels prepared from coating solution D with silicate ions showed significantly less abrasion than did the panels prepared from coating solution A without silicate ions.

It will be apparent to those skilled in the art that the novel principles of the invention disclosed herein in connection with specific examples thereof, will suggest various other modification and applications of the same. It is accordingly desired that in construing the breadth of the appended claims they shall not be limited to the specific examples of the invention disclosed herein.

I claim:

1. A composition for providing a metallic surface with protection against marring, marking, and staining which consists essentially of an aqueous solution containing ions from the group consisting of phosphate, chromate, magnesium, ammonium, and silicate: said aqueous solution having a molar concentration of phosphate, chromate, magnesium, and ammonium ions of between 0.01 and 1.00 mole per 100 ml. of water; said phosphate, chromate, magnesium, and ammonium ions being proportionately present in said aqueous solution as 27-73 mole percent phosphate ion, 5-39 mole percent chromate ion, 0-23 mole percent magnesium ion, and 0.5-35 mole percent ammonium ion; said aqueous solution having a molar concentration of silicate ions of from 0.01-33% of said molar concentration of phosphate, chromate, magnesium, and ammonium ions.

2. A composition according to claim 1 wherein said aqueous solution has a molar concentration of phosphate, chromate, magnesium, and ammonium ions of between 0.5 and 0.60 mole per 100 ml. of water.

3. A composition according to claim 1 wherein said phosphate, chromate, magnesium, and ammonium ions are proportionately present in said aqueous solution as 40-67 mole percent phosphate ion, 7-26 mole percent chromate ion, 5-20 mole percent magnesium ion, and 4-20 mole percent ammonium ion.

4. A composition according to claim 1 wherein said aqueous solution has a molar concentration of silicate ions of from 0.5-20% of said molar concentration of phosphate, chromate, magnesium, and ammonium ions.

5. A composition for providing a metallic surface with protection against marring, marking and staining which consists essentially of an aqueous solution containing ions from the group consisting of phosphate, chromate, magnesium, ammonium, alkali metals, and silicate: said aqueous solution having a molar concentration of phosphate, chromate, magnesium, and ammonium ions of between 0.25 and 0.60 mole per 100 ml. of water; said phosphate, chromate, magnesium, and ammonium ions being proportionately present in said aqueous solution as 40-67 mole percent phosphate ion, 7-26 mole percent chromate ion, 0-23 mole percent magnesium ion, and 4-20 mole percent ammonium ion, said aqueous solution having a molar concentration of silicate ions of from 0.5-20% of said molar concentration of phosphate, chromate, magnesium and ammonium ions.

6. A method of providing a metallic surface with a transparent cured coating for protecting the metallic surface against marring, marking, and staining, which comprises the steps of: coating said surface with an aqueous solution containing ions from the group consisting of phosphate, chromate, magnesium, ammonium, and silicate and curing said coating so as to render it substantially water insoluble; said aqueous solution having a molar concentration of phosphate, chromate, magnesium, and ammonium ions of between 0.01 and 1.0 mole per 100 ml. of water; said phosphate, chromate, magnesium, and ammonium ions being proportionately present in said aqueous solution as 27-73 mole percent phosphate ion, 5-39 mole percent chromate ion, 0-23 mole percent magnesium ion, and 0.5 to 35 mole percent ammonium ion, said aqueous solution having a molar concentration of silicate ions of from 0.01-33% of said molar concentration of phosphate, chromate, magnesium and ammonium ions.

7. A method according to claim 6 wherein said aqueous solution has a molar concentration of phosphate, chromate, magnesium and ammonium ions of between 0.25 and 0.60 mole per 100 ml. of water.

8. A method according to claim 6 wherein said phosphate, chromate, magnesium, and ammonium ions are proportionately present in said aqueous solution as 40-67 mole percent phosphate ion, 7-26 mole percent chromate ion, 5-20 mole percent magnesium ion, and 4-20 mole percent ammonium ion.

9. A method according to claim 6 wherein said aqueous solution has a molar concentration of silicate ions of from 0.5-20% of said molar concentration of phosphate, chromate, magnesium, and ammonium ions.

10. A method according to claim 6 adapted to provide a colored protective coating which includes the step of adding pigments or dyes to the aqueous coating solution.

11. A method according to claim 6 wherein said coating is cured by heating said metallic surface at a temperature of from about 400° F. to about 1900° F. for a period of from 2 seconds to about 4 hours.

12. A method according to claim 6 adapted to protect a metallic surface selected from the group consisting of stainless steel, brass, aluminum, silver, zinc, copper, plain carbon steel, lead chromium, nickel, gold, platinum, and alloys of said metals.

13. A method according to claim 12 wherein said metallic surface is stainless steel.

14. A method of providing a decorative exposed metallic surface with a transparent cured coating for protecting the metallic surface against marring, marking, and staining which comprises the step of: coating said surface with an aqueous solution containing ions from the group consisting of phosphate, chromate, magnesium, ammonium, alkali metals, and silicate and curing said coating so as to render it substantially water insoluble; said aqueous solution having a molar concentration of phosphate, chromate, magnesium, and ammonium ions of between 0.25 and 0.60 mole per 100 ml. of water; said phosphate, chromate, magnesium, and ammonium ions being proportionately present in said aqueous solution as 40–67 mole percent phosphate ion, 7–26 mole percent chromate ion, 0–23 mole percent magnesium ion, and 4–20 mole percent ammonium ion; said aqueous solution having a molar concentration of silicate ions of from 0.5–20% of said molar concentration of phosphate, chromate, magnesium, and ammonium ions.

15. A method according to claim 12 wherein said metallic surface is brass.

16. A method according to claim 12 wherein said metallic surface is aluminum.

17. A method according to claim 12 wherein said metallic surface is silver.

18. A composite article comprising a layer of metal adhered to at least one layer of a substantially water insoluble, cured coating comprised of anionic polymeric chains of phosphorus, chromium, oxygen and silicon atoms; said coating having been formed from an aqueous solution containing ions from the group consisting of phosphate ions, chromate ions, magnesium ions, ammonium ions and silicate ions; said solution having a molar concentration of phosphate ions, chromate ions, magnesium ions and ammonium ions of between 0.01 and 1.00 mole per 100 ml. of water; said phosphate, chromate, magnesium and ammonium ions being proportionately present in said solution as 27–73 mole percent phosphate ion, 5–39 mole percent chromate ion, 0–23 mole percent magnesium ion, and 0.5–35 mole percent ammonium ion; said solution having a molar concentration of silicate ions of from 0.01–33% of said molar concentration of phosphate, chromate, magnesium and ammonium ions; said coating providing said metal with protection against marring, marking and staining.

19. An article according to claim 18 wherein said coating is comprised of magnesium cations and anionic polymeric chains of phosphorus, chromium, oxygen, and silicon atoms.

20. An article according to claim 19 wherein each layer of said coating is less than 0.0005 inch thick.

21. An article according to claim 19 wherein said metal is selected from the group consisting of stainless steel, brass, aluminum, silver, zinc, copper, plain carbon steel, lead, chromium, nickel, gold, platinum, and alloys of said metals.

22. An article according to claim 21 wherein said metal is stainless steel.

23. An article according to claim 19 wherein said water insoluble, cured coating is transparent and colorless.

24. An article according to claim 19 wherein said water insoluble, cured coating is transparent and colored.

25. An article according to claim 19 wherein said metal is stainless steel and wherein each layer of said coating is less than 0.0005 inch thick.

26. A composite article comprising a layer of metal, having a decorative exposed surface, adhered to at least one layer of a substantially water insoluble, cured coating comprised of alkali metal cations and anionic polymeric chains of phosphorus, chromium, oxygen, and silicon atoms; said coating having been formed from an aqueous solution containing ions from the group consisting of phosphate ions, chromate ions, magnesium ions, ammonium ions, alkali metal ions and silicate ions; said solution having a molar concentration of phosphate ions, chromate ions, magnesium ions and ammonium ions of between 0.25 and 0.60 mole per 100 ml. of water; said phosphate, chromate, magnesium and ammonium ions being proportionately present in said solution as 40–67 mole percent phosphate ion, 7–26 mole percent chromate ion, 0–23 mole percent magnesium ion and 4–20 mole percent ammonium ion; said solution having a molar concentration of silicate ions of from 0.5–20% of said molar concentration of phosphate, chromate, magnesium and ammonium ions; said coating providing said metal with protection against marring, marking and staining.

27. An article according to claim 21 wherein said metal is brass.

28. An article according to claim 21 wherein said metal is aluminum.

29. An article according to claim 21 wherein said metal is silver.

References Cited
UNITED STATES PATENTS

| | | | |
|---|---|---|---|
| 3,248,250 | 4/1966 | Collins | 106—14 X |
| 2,753,282 | 7/1956 | Perry | 148—6.16 |
| 2,418,608 | 4/1947 | Thompson et al. | 148—6.16 X |
| 3,180,746 | 4/1965 | Patton et al. | 106—14 X |
| 3,447,973 | 6/1969 | DeLong et al. | 148—6.27 X |
| 2,964,415 | 12/1960 | Payne et al. | 106—74 |
| 944,957 | 12/1909 | Eberhard | 106—74 |
| 1,581,732 | 4/1926 | Hageman et al. | 106—74 |
| 2,529,206 | 11/1950 | Winslow et al. | 148—6.16 X |
| 3,248,251 | 4/1966 | Allen | 148—6.16 X |

RALPH S. KENDALL, Primary Examiner

C. WESTON, Assistant Examiner

U.S. Cl. X.R.

106—14; 148—6.15 R, 6.2